No. 828,698. PATENTED AUG. 14, 1906.
L. ZAMBONI.
PULLEY FRAME.
APPLICATION FILED JULY 18, 1904.
FIG. I.
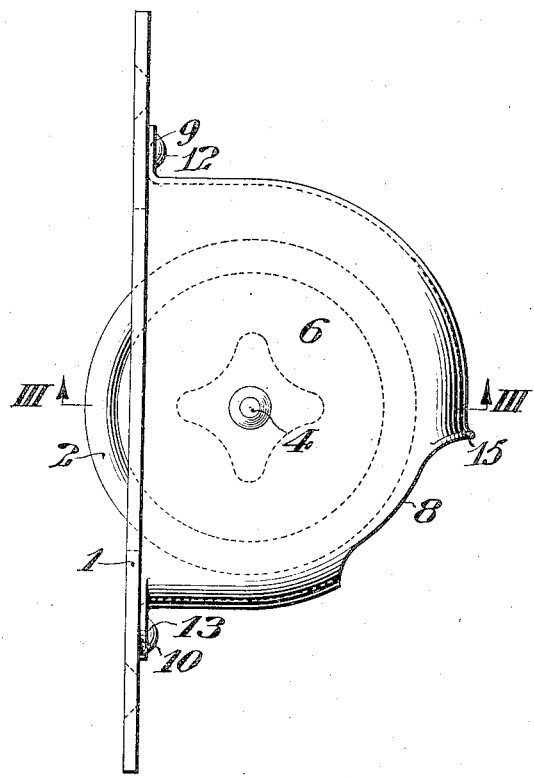
FIG. II.
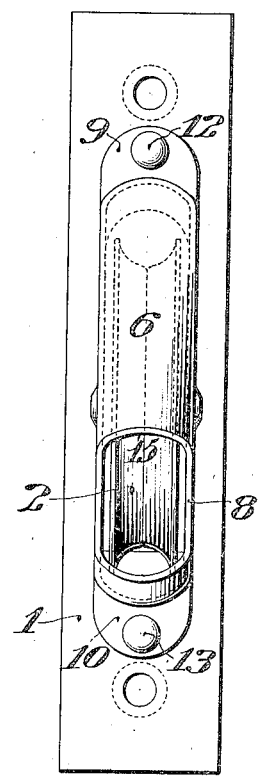
FIG. III.
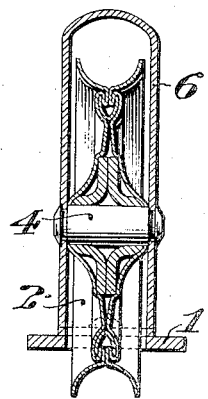
WITNESSES:
Clifton C. Hallowell
John C. Bergner
INVENTOR:
LAWRENCE ZAMBONI,
by Prigg, Paul & Foley
Attys.

UNITED STATES PATENT OFFICE.

LAWRENCE ZAMBONI, OF PHILADELPHIA, PENNSYLVANIA, ASSIGNOR TO THE AMERICAN PULLEY COMPANY, OF PHILADELPHIA, PENNSYLVANIA, A CORPORATION OF PENNSYLVANIA.

PULLEY-FRAME.

No. 828,698.    Specification of Letters Patent.    Patented Aug. 14, 1906.

Application filed July 18, 1904. Serial No. 217,090.

*To all whom it may concern:*

Be it known that I, LAWRENCE ZAMBONI, of Philadelphia, in the State of Pennsylvania, have invented certain new and useful Improvements in Pulley-Frames, whereof the following is a specification, reference being had to the accompanying drawings.

My invention relates particularly to frames for window-sash pulleys; and it is the object of my invention to provide a frame of pressed sheet metal which can be manufactured at less cost than the cast-metal frames heretofore employed.

As hereinafter described, my invention includes a frame comprising a face-plate which is adapted to be set in the window-jamb and to which is rigidly secured a pressed sheet-metal casing inclosing a pulley and supporting a shaft upon which the pulley rotates. Said casing may be formed of a single piece of sheet metal drawn by pressing operations so as to comprise a rearwardly-extending perimeter curved in substantially concentric relation with the pulley and forming a dust-proof cover for the same, said perimetric portion of the casing being integral with both of the sides thereof and the ends of the casing being provided with lugs in engagement with rivets by which the casing is secured to the face-plate. Said perimetric portion of the casing comprises a recess of limited area through which the cord extends from the pulley, and said recess is provided with a rounded marginal flange to avoid abrasion of the cord.

My invention comprises the various novel features of construction and arrangement hereinafter more definitely specified.

In the drawings, Figure I is a side elevation of a frame conveniently embodying my invention. Fig. II is a rear elevation of said frame. Fig. III is a sectional view taken on the line III III in Fig. I.

In said figures, 1 is the face-plate, through which the pulley 2 projects, adjoining the sash whose cord is to extend over said pulley. Said pulley is mounted to rotate on the shaft 4, which extends through and is provided with rivet-heads outside of the casing 6, which is pressed from a single piece of sheet metal inclosing said pulley and provided with a recess 8, through which the cord depends from the pulley within the window-box. It may be noted that the rearwardly-extending perimeter of said casing 6 is curved in substantially concentric relation with said pulley 2 and forms a dust-proof cover for the upper portion thereof. Said casing is provided with lugs 9 and 10 to receive the rivets 12 and 13, which support the casing in rigid relation to the face-plate 1.

It may be noted that, as indicated in Fig. I, the recess 8 in the casing is provided with the rounded marginal flange 15, so that the sash-cord will not be abraded if swung into contact therewith by the vibration of the sash-weight.

Referring particularly to Fig. I, it may be noted that the shaft 4 is disposed eccentrically in relation to the height of the pulley-casing to afford a larger space above than below the pulley 2, for the reason that the cord extends over the pulley and the desired room for the same is thus secured within the minimum amount of metal.

Although I have shown the casing secured to the face-plate 1 by rivets 12 and 13, it is to be understood that other means of connecting said members may be employed.

I do not desire to limit myself to the precise details of construction and arrangement herein specified, as various modifications may be made therein without departing from the essential features of my invention.

I claim—

1. In a pulley-frame, the combination with a pressed sheet-metal face-plate; of a pressed sheet-metal casing having a rearwardly-extending perimeter curved in substantially concentric relation with the pulley, said perimetric portion of the casing being drawn integral with both of the sides thereof; means distinct from said face-plate and casing connecting them in rigid relation; a shaft in said casing; and a pulley mounted to rotate in said casing on said shaft, substantially as set forth.

2. In a pulley-frame, the combination with a pressed sheet-metal face-plate, of a pressed sheet-metal casing formed of a single piece distinct from said face-plate, having a rearwardly-extending perimeter curved in substantially concentric relation with the pulley, said perimetric portion of the casing being drawn integral with both of the sides thereof; flanges integral with and part of the casing extending from said casing at opposite ends thereof in parallel relation with said face-plate; means local to said flanges connecting said face-plate and casing in rigid relation; a shaft in said casing; and a pulley mounted to rotate in said casing on said shaft, substantially as set forth.

3. In a pulley-frame, the combination with a pressed sheet-metal face-plate, of a pressed sheet-metal casing formed of a single piece distinct from said face-plate, having a rearwardly-extending perimeter curved in substantially concentric relation with the pulley, said perimetric portion of the casing being drawn integral with both of the sides thereof; said perimetric portion of the casing comprising a recess through which the cord extends and a rounded marginal flange on said recess; flanges integral with and part of the casing extending from said casing at the opposite ends thereof in parallel relation with said face-plate; means local to said flanges connecting said face-plate and casing in rigid relation; a shaft in said casing; and a pulley mounted to rotate in said casing on said shaft, substantially as set forth.

In testimony whereof I have hereunto signed my name, at Philadelphia, Pennsylvania, this 14th day of July, 1904.

LAWRENCE ZAMBONI.

Witnesses:
JOSEPH ENTWISLE,
CHARLES E. BIRNLEY.